A. J. Allen.
Steam Gauge.
No. 2,313. Reissued Jul. 17, 1866.
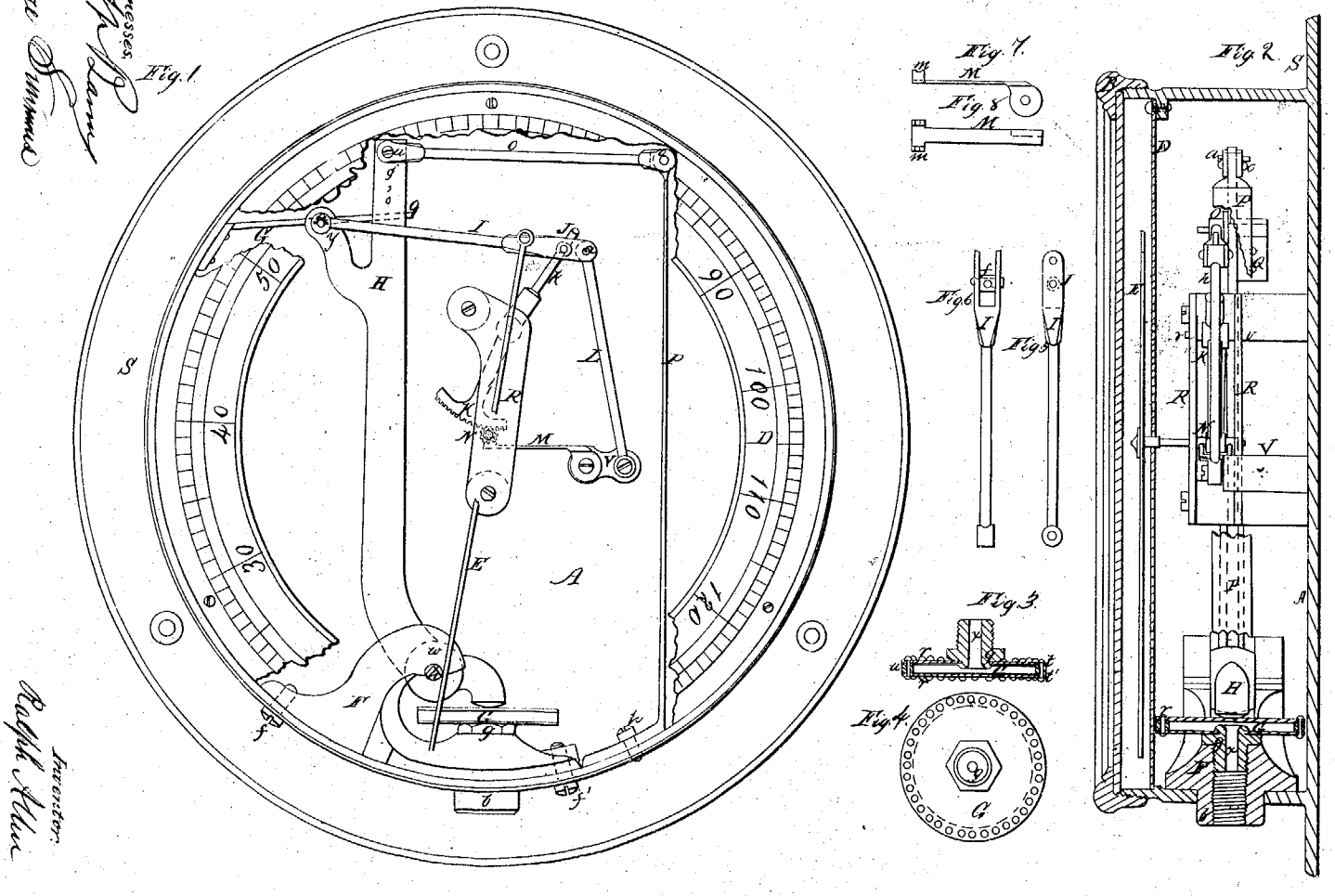
Witnesses.
N. P. Ramy
George Simmons
Inventor.
Ralph Allen

UNITED STATES PATENT OFFICE.

RALPH ALLEN, OF ROCK STREAM, NEW YORK, ASSIGNEE OF ALBERT J. ALLEN.

IMPROVEMENT IN STEAM-GAGES.

Specification forming part of Letters Patent No. 25,615, dated October 4, 1859; Reissue No. 2,313, dated July 17, 1866.

*To all whom it may concern:*

Be it known that ALBERT J. ALLEN, of the city of Buffalo and county of Erie, in the State of New York, invented a new and useful Improvement in Steam-Gages; and I do hereby declare that the following is a full, clear, and exact description of the construction and operation of the same.

I will first describe what I consider the best mode of carrying out the invention, and will afterward point out the features which I consider new.

The annexed drawings form a part of this specification, in which—

Figure 1 is a front elevation with the top ring, glass, and portions of the dial-plate removed. Fig. 2 is a transverse section with part of the case removed. Figs. 3 and 4 are different views of capsule G, showing its construction. Figs. 5 and 6 are different views of connecting-rod I, showing its construction, also showing swivel-block J in its place in said rod. Figs. 7 and 8 are different views of friction-spring M, showing its construction.

Similar letters of reference indicate corresponding parts on the several figures.

A represents a steam-gage case of the ordinary construction, being of metal, of a cylindrical shape, with one end closed and the other end open. It also has a flange, S, on the outside at its closed end. The cylinder is about two inches deep, and has a screw cut on the outside at the open end, on which is screwed a ring, B, Fig. 2, which serves the purpose of holding in place the glass plate C. The glass plate C serves the purpose of protecting the dial-plate D and index-pointer E from damage, and at the same time allows them to be seen through its transparency. It also serves to keep out dust from the working parts.

F is a fulcrum-block having its lower side of circular shape to fit the case A, to which it is secured by screws *f* and *f'*. It also has a projecting pipe, *b*, on its circular side, that passes through the side of case A, making a connection with the outside. The pipe *b* has a screw cut in its inside, into which the capsule G is securely screwed steam-tight, at the same time leaving sufficient space in the out end of pipe *b* to make a connection with a steam-boiler by means of suitable pipe and couplings. A part of fulcrum-block F turns upward and hooks over a part of capsule G. This horn has a slot in its center dividing it into two parts, between which parts the lever H is embraced. This horn also has a small hollow on its under side, near its point marked *w*, in which the fulcrum-pin *h* bears.

G is a capsule of metal permanently elastic, and of such kind as will not oxidize injuriously when in contact with steam or water. I use the metal that melodeon-reeds are made of, preferring that for its easy elasticity, steel being unfit, as it soon corrodes away and is too rigid. The construction of this capsule is best seen in Figs. 3 and 4. After having prepared the plates *t t'* of the proper thickness I secure the pipe *g*, having a hole, *x*, through its center longitudinally, and a screw cut on one of its ends, to plate *t*, placing it in its center and at right angles to its face, then, putting ring *u* between *t* and *t'*, rivet the whole together with rivets *r r r*, &c., making it entirely steam-tight, except the hole *x* through pipe *g*, through which the steam or water is to enter to operate the gage.

H is a crooked lever of cast-iron having a fulcrum-pin, *h*, near its lower end, which bears upward against the divided horn on fulcrum-block F, which embraces the lever H, the fulcrum-pin bearing in hollow *w* on both sides of the lever to keep it firmly in place.

The lever H has a crooked point, *z*, which rests on capsule G. It also has a prong, *y*, near its upper end carrying the pin *a*, on which the rod I is secured, but allowed to work freely. The upper end has a number of holes, *j*, by which the rod O is attached and the tension of the spring P is graduated.

P is a thin, flat, straight spring of suitable stiffness and temper, having an eye at its upper end and the lower end bent to fit the case A, to which it is secured by the screw *p*.

O is a rod of metal, having jaws on each of its ends, and is secured to the spring P by a pin, *o*, and to the lever H by a screw-pin, *a*, which secures the lever and spring together and causes them to act in concert.

Q is a thin strip of metal secured to the side of the case A, and extending behind the lever H, and having a hook, *q*, on its end to stop the lever H and resist a small amount of tension from the spring P and keep the whole in place when at rest.

R is a frame-work carrying a segment, K, and pinion N. K is a toothed segment working on its small pivots *v v*, and having a round tail-piece, *k*, on which a swivel-block, J, slides.

I is a metal rod, having an eye at one end, which fits on the pin *a* in the lever H, and at the other end a fork, in which the swivel-block J is secured, but allowed to turn freely. It also embraces in its open end the radius-bar L. Its construction is fully seen in Figs. 5 and 6. The swivel-block J is made of steel, and has small trunnions on its ends and a hole through its center at right angles to its trunnions, and fits accurately the tail *k* of segment K, on which it slides.

L is a radius-bar of metal, having an eye at each of its ends, one end being secured to a post, V, by a screw, *l*, on which it turns, but fits accurately. The other end fits into the fork in the end of I and is secured by the rivet *o*, on which it turns freely, but fits accurately. The object of this rod is to diminish the length of lever on the tail-piece *k* of segment K through the agency of the rod I and swivel-block J, to equalize the the tension of the spring P, and cause a greater movement of the index-pointer E over the dial-plate D, making the division greater in the higher grades where most used, thus enabling the engineer and fireman to more readily detect the changes that are taking place when the steam is rapidly generated, as in the locomotive-engine, and the more readily maintaining an even pressure, and saving fuel thereby.

M is a friction-spring, and is best shown in Figs. 7 and 8. It is made of elastic metal of the proper thickness, having a palm at one end, by which it is secured to the post V by a screw, *n*. At the other end are two projections wide enough apart to embrace the pinion N without touching the pinion. The projections have little hollows *m* in their ends that fit against the shaft of pinion N, as shown by dotted lines in Fig. 1. The use of this spring is to prevent the vibrating motion of index-pointer E in places where the gage is liable to jar and shaking, as on locomotive-engines, and prevent the wearing of the segment and pinion, as all the gages now in use are unreliable in such places and rapidly wear so as to render them useless for any purpose of accuracy or safety. This device obviates that difficulty.

Having described all the parts of the gage, I will now describe its operation. The first operation will be to secure the gage by its flange S in some convenient place near or attached to the steam-boiler and then connect it to such boiler by means of a suitable pipe leading from the boiler and uniting with the gage at pipe *b* of fulcrum-block F.

Having thus connected the gage with the boiler, as the steam is generated it flows through the pipe and enters the capsule G, which, being very thin, readily expands and bulges out at the sides, and, being confined by the block F, can only expand upward, pressing against the end *z* of the lever H, pressing against the fulcrum-pin *h*, and carrying the upper or long end of the lever H backward a distance proportionate to its length as composed with the end *z*, and carrying with it the rod I, attached to the prong *y* and with the rod I is carried the swivel-block J and the end of radius-bar L; and the tail-piece *k* of the segment K, being attached to the swivel-block J, is carried back with it, and the toothed segment, being carried in the opposite direction, causes the pinion N to turn around, carrying with it the index-pointer E over the dial-plate D, and thus pointing out the pressure in the boiler in pounds per square inch. The radius-bar L at the same time in its movement back with the rod I pulls the end carrying the swivel-block J in toward the center of the segment K, and causing an accelerated movement of the pinion N, and consequently causing the index-pointer to mark a wider space on the dial-plate for the same movement of the lever H, as shown on dial-plate between thirty and ninety. This can be varied by the position and length of the radius-bar L, so as to always have the widest divisions at the part of the gage-dial where most used. The spring P serves to counteract the excess of pressure in the capsule G and to bring all back to the proper position when the steam is withdrawn.

The friction-spring M, pressing its forked end against the shaft of the pinion N above and below the pinion, effectually prevents all vibration of the pointer E, and prevents all wear of pinion and segment, and thus corrects a serious difficulty that exists with all gages now in use when applied to locomotive-engines or in other places where a shaking motion is produced.

I do not limit myself to the use of melodeon-reed metal as the material of the capsule G. Any other rolled sheet of brass or analogous composition may be used which possesses a good degree of elasticity and is not corrodable; but I attach much importance to the fact that I use sheet metal as distinguished from cast both because sheet metal is more uniform in thickness and because it is more dense and elastic. I also attach importance to the fact that the faces of the capsule are not dome-shaped, as I find that spherical or dome-shaped faces, whether the convex side be turned inward or outward, will not induce the proper degree of elasticity.

I do not claim using a flexible capsule of elastic metal or other material in a gage, except when peculiarly arranged; but,

Having now fully described the said improved gage, what I claim as new, and desire to secure by Letters Patent, as the invention of the said ALBERT J. ALLEN, is as follows:

1. The improved pressure-gage herein described, consisting of the following parts: first, the within-described elastic capsule having faces formed of sheet metal, neither convex nor concave, to be connected with the boiler to receive and be expanded by the pressure of the steam; and, second, multiplying-levers and index, the whole being so arranged as to render available the elasticity of two opposite faces of said capsule at the same time in operating the index through the medium of delicately-operating levers, substantially as and for the purpose herein set forth.

2. Mounting such capsule, in combination with the other parts, so that the steam is admitted at the center of one of the said faces or ends, substantially as and for the purpose herein specified.

3. The employment of the capsule G, of peculiar construction, having the steam admitted at one side and through the center of that side, and using the flexibility of both sides, (such capsule being made of a permanently-elastic metal and not injuriously oxidized by steam or water, preferring, for that purpose, the metal used in making melodeon-reeds,) in combination with fulcrum-block F, lever H, spring P, rod O, rod I, swivel-block J, radius-bar L, and segment K, having tail-piece *k*, pinion N, index-pointer E, dial-plate D, and friction-pressure spring M, substantially as shown and described.

4. Radius-bar L, in combination with rod I, swivel-block J, segment K, having tail-piece *k*, pinion N, index-pointer E, and dial-plate D, having increasing divisions on its face, substantially as shown and described.

RALPH ALLEN.

Witnesses:
C. W. BARNES,
GEORGE SIMMONS.